March 26, 1968
J. P. JAGY ET AL
3,375,430
RESISTIVE NETWORK FOR SYNCHRO TO RESOLVER VOLTAGE CONVERSION
Filed Aug. 16, 1965
2 Sheets-Sheet 2
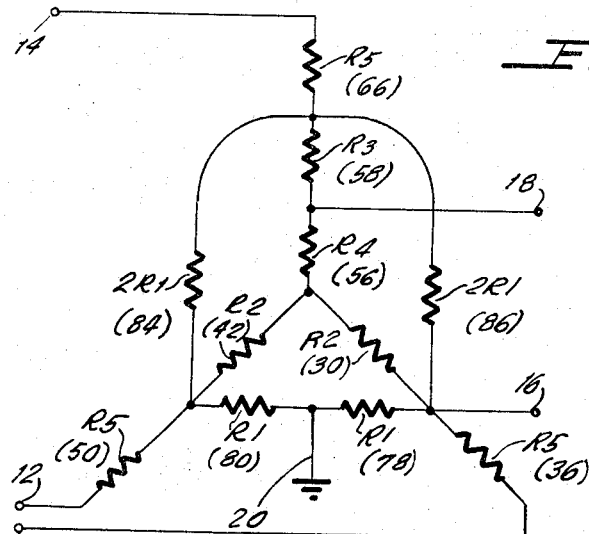
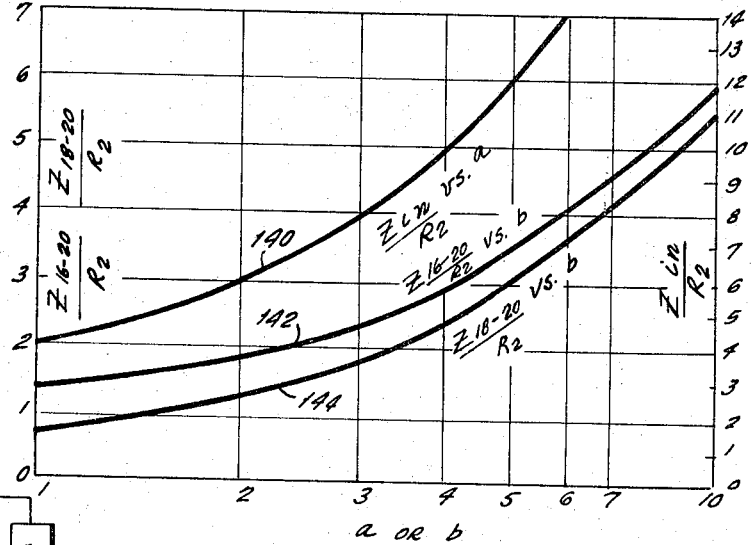
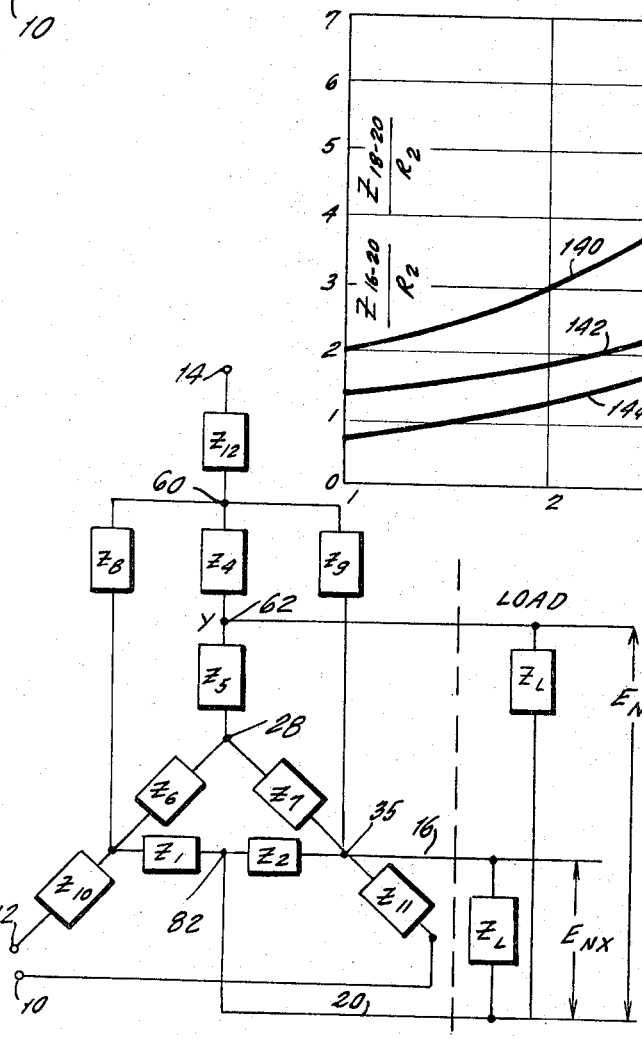
INVENTORS
JOHN P. JAGY
JOHN M. SCUTT
BY

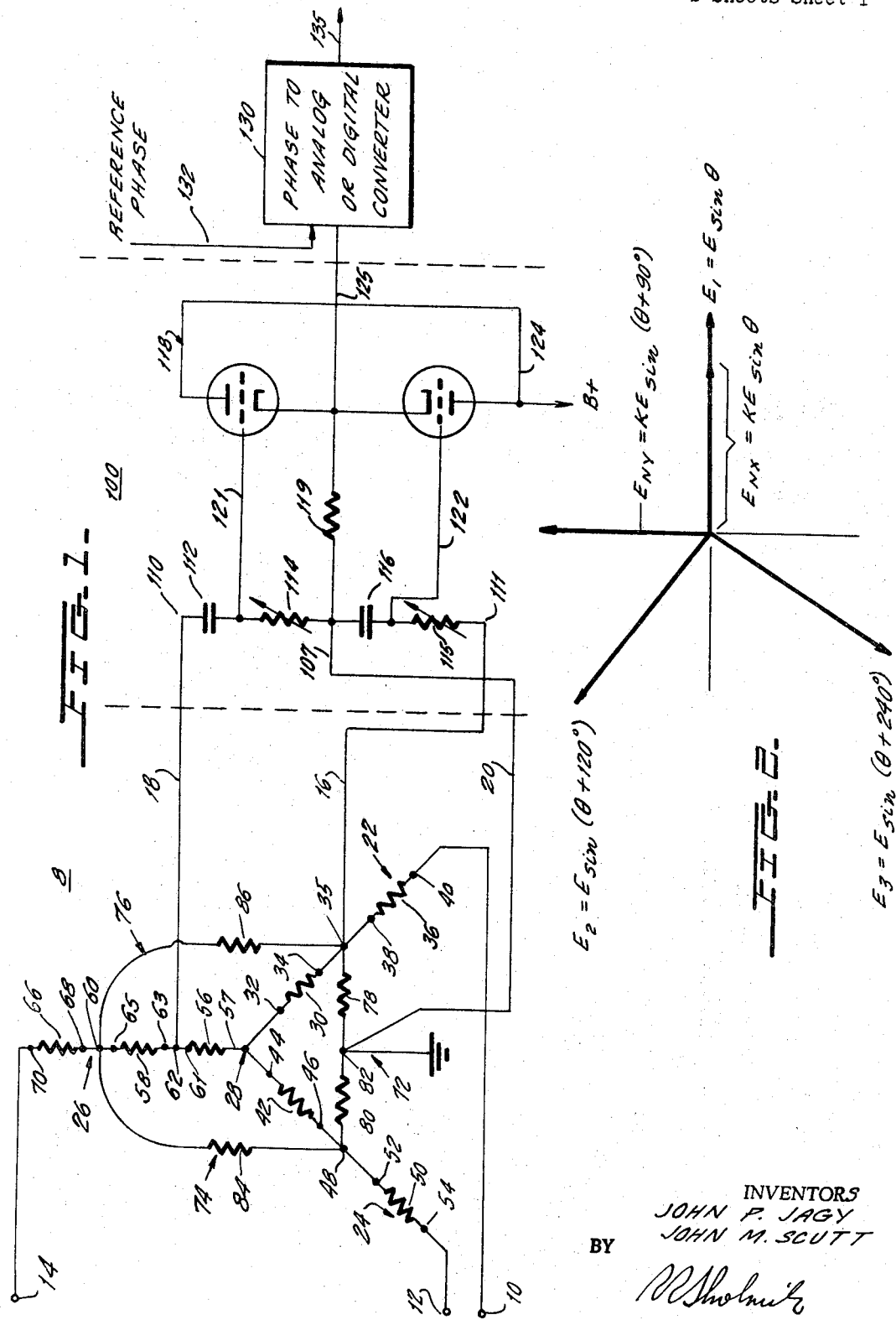

United States Patent Office 3,375,430
Patented Mar. 26, 1968

3,375,430
RESISTIVE NETWORK FOR SYNCHRO TO RESOLVER VOLTAGE CONVERSION
John P. Jagy, Syosset, and John M. Scutt, Great Neck, N.Y., assignors to Sperry Rand Corporation, Ford Instrument Company Division, Long Island City, N.Y., a corporation of Delaware
Filed Aug. 16, 1965, Ser. No. 479,985
17 Claims. (Cl. 321—58)

ABSTRACT OF THE DISCLOSURE

A signal transformation network is provided with a passive impedance network for the reception of synchro signals and the accurate conversion of these signals to equivalent resolver signals. The passive network is resistive and has a plurality of resistors connected in a predetermined array to provide a high impedance balanced input for the reception of synchro signals and the conversion to equivalent resolver signals at the output terminals of the network.

---

This invention relates to a signal transformation network, and more particularly to a passive network which presents a high impedance balanced input to synchro signals, and converts such synchro signals to equivalent resolver signals.

A synchro is a well known type of device for the transfer of angular-position data to related electrical signals. The synchro consists of cooperating rotor and stator windings. The manner in which such synchros operate for the generation and transmission of angular position to a remote location is well known in the art, with reference, for example, being made to the U.S. Government Publication, Basic Electricity, NAVPERS 10086-A, 1960, chapter 19, for a more detailed discussion thereof.

The rotor may, for example, be connected to a shaft whose angular position is to be remotely transmitted. The stator winding will typically consist of three coils stationarily located about the angularly movable rotor winding. As the rotor position is changed, the voltages induced in the respective stator windings will be proportionally related to the rotor excitation and sine functions of the rotor position angle, $\theta$, such that the derived synchro signals may be represented by the mathematical relationships:

$$E_1 = E \sin \theta \quad (1)$$
$$E_2 = E \sin (\theta + 120°) \quad (2)$$
$$E_3 = E \sin (\theta + 240°) \quad (3)$$

where:

$E_1$, $E_2$ and $E_3$ are the RMS synchro stator voltages,
E is the maximum RMS value of each stator voltage, and
$\theta$ is the angular position of the synchro rotor with respect to electrical zero.

In the generation and transmission of angular positional data, it is oftentimes desirable to represent such information in the form of sine and cosine resolver signals, such signals corresponding to the rotor angle position, $\theta$ and $(\theta + 90°)$. See, for example, U.S. Patent No. 2,968,759 entitled "Phase Rotation Circuit," issued Jan. 17, 1961, and assigned to the assignee of the instant invention, which shows a sine-cosine resolver for the generation of such a pair of voltages. The need also arises to convert synchro output signals as represented in Equations 1, 2, 3 to equivalent resolver signals, with the relationship between such signals being given by the mathematical expression:

$$E_{nx} = kE \sin \theta \quad (4)$$
and
$$E_{ny} = kE \sin (\theta + 90°) \quad (5)$$
where:

$E_{nx}$ and $E_{ny}$ are the resolver RMS voltages when the angular position of the resolver rotor is the same as that of the synchro, and
$k$ is an arbitrary constant.

Previously, the conversion of synchro signals to equivalent resolver signals has necessitated the complex, expensive and space-consuming arrangement of various synchro-resolver combinations or the utilization of transolvers (a device having a 3-phase stator and a 2-phase rotor, or vice versa).

Our invention is particularly directed to achieving such signal conversion in a more reliable, simpler and less expensive manner than any of such prior art arrangements. Specifically, we provide a passive impedance network, typically resistive, which presents a high impedance balanced input for the reception of synchro signals, and accurately converts such signals to equivalent resolver signals at the output terminals thereof.

In one form of our invention, the signal transformation network is formed of eleven precision resistors, with matched temperature coefficients. The resistors are connected together in a mathematically determined array, forming first, second and third legs meeting at a common juncture point, and including bridging circuitry intermediate the legs. The legs each include a high impedance series resistor, series connected to the respective synchrosignal terminals, with such series resistor serving to insure a high impedance balance condition. The output signals are derived from predetermined points of the resistive array. The parameters of the resistors are predeterminedly selected such that a high impedance balanced input condition is assured, while a substantially lower output impedance is established. Preferably, the balanced input impedance may be in the order of at least 20,000 ohms, intermediate adjacent ones of the input leg terminals. The provision of such a high input impedance preferably minimizes the disturbance and loading effect of the resistive network to the synchro device.

If desired, the equivalent resolver output signals provided by the signal transformation network of our invention may be presented to the phase rotation circuit which is the subject of aforementioned U.S. Patent No. 2,968,759. As fully described in that patent, the equivalent resolver signals will then be converted into a constant amplitude signal related in phase to the rotor angular position. The constant amplitude signal may, in turn, be presented to numerous types of phase sensitive devices, as, for example, a phase detector, phase measuring servo system, or phase-to-analog, or digital converter, to provide a simplified output signal of rotor angle position.

It is, therefore, seen that the basic concept of our invention resides in providing a simplified signal transmission network, wherein synchro output signals related in phase to rotor angle position $\theta$ ($\theta + 120°$), and ($\theta + 240°$), are efficiently and accurately converted into an equivalent pair of resolver signals related to $\theta$ and ($\theta + 90°$).

Accordingly, it is a primary object of our invention to provide a signal transformation network for converting synchro signals to equivalent resolver signals.

A further object of our invention is to provide a signal transformation network which presents a balanced high impedance to the output of a synchro and accurately converts the synchro signals into equivalent resolver signals.

Another object of our invention is to provide such a signal transformation network formed only of passive circuit elements.

An additional object of our invention is to provide a resistive network which presents a high input impedance balance condition to synchro signals and converts such signals to equivalent resolver voltages.

Still a further object of our invention is to provide a signal transformation network which is adapted to receive synchro signals and converts such signals to a constant amplitude voltage having a time phase with respect to the synchro excitation voltage, which is a precise linear function of the synchro transmitter rotor angle.

Still another object of our invention is to provide an improved signal transformation network for the conversion of synchro information to analog or digital information, representative of the synchro rotor angular position.

A still further object of our invention is to provide a signal transformation network which has a low output impedance.

Another object of our invention is to provide a signal transformation network which has an isolated virtual synchro ground.

These as well as other objects of our invention will become readily apparent upon a consideration of the following description and drawings in which:

FIGURE 1 is a schematic of the signal transformation network of our invention operating in conjunction with the phase rotation circuitry of aforementioned Patent No. 2,968,759.

FIGURE 2 is a vector diagram showing the relationship between the synchro signals and the equivalent resolver signals derived therefrom by the signal transformation network of our invention.

FIGURE 3 is the generalized, mathematically derived balanced impedance network for achieving the advantageous objectives of our invention.

FIGURE 4 shows the resistive converter portion of FIGURE 1, and wherein components of like value are indicated by similar designations.

FIGURE 5 graphically depicts the relationship between the input and output impedances of our signal transformation network with respect to the variation of certain ones of the derived parameters.

Referring to the drawings, and particularly FIGURE 1 thereof, the synchro resolver converter 8 of our invention is shown having input terminals 10, 12, 14, respectively, for receiving conventional synchro stator signals. The stator signals received at these points may be represented by the mathematical relationships (1) (2) (3) above. As will be subsequently developed in greater detail, the synchro resolver converter 8 presents a high impedance balanced input between terminals 10, 12, 14, respectively, and converts the synchro input signals to equivalent resolver signals between output terminals 16, 18, 20. The equivalent resolver signals appearing between terminal 16 and common terminal 20; and terminal 18 and common terminal 20 may be represented by the mathematical relationship (4) and (5) above.

The synchro resolver converter 8 is shown as a resistive network, which consists of a mathematically determined array of eleven precision value resistors predeterminedly selected to yield the requisite signal conversion. The resistive network includes legs 22, 24, 26, respectively, which meet at common junction points 28. Leg 22 includes a resistor 30 having a first terminal 32 connected to the common juncture points 28, and a second terminal 34 connected to an intermediate point 35 along the leg 22; in series with a resistor 36 having a first terminal 38 connected to intermediate leg point 35 and a second terminal 40 corresponding to the input terminal 10. Similarly, leg 24 includes a resistor 42 having a first terminal 44 connected to common juncture point 28 and a second terminal 46 connected to its intermediate leg point 48; in series with resistor 50 having a first terminal 52 connected to intermediate leg point 48 and a second terminal 54 corresponding to input terminal 12. Leg 26 includes a resistor 56 having a first terminal 57 connected to the common juncture point 28, and a second terminal 61 connected to an intermediate point 62. Leg 26 continues with a series resistor 58 having a first terminal 63 connected to intermediate leg point 62 and a second terminal 65 connected to another intermediate point 60. A third resistor 66 in leg 26 has a first terminal 68 connected to intermediate point 60, and a second terminal 70 corresponding to the input terminal 14. The intermediate leg points 35, 48 and 60 are connected together by bridging circuits 72, 74, 76, respectively. Specifically, intermediate leg points 35, 48 are connected together by bridging circuit 72, which includes equal resistive members 78, 80 with the common junction thereof 82 corresponding to the common output terminal 20. The resistor 84 is series connected within the branch arm 74 joining intermediate leg points 48, 60. Resistor 86 is similarly series contained within the branch arm 76 joining points 60 and 35.

To provide a balanced condition of the resistive network, the following relationship is maintained with respect to the individual resistor members:

$$R_{30}=R_{42}=(R_{56}+R_{58})$$
$$R_{36}=R_{50}=R_{66}$$
$$R_{84}=R_{86}=(R_{78}+R_{80})$$
$$R_{78}=R_{80}$$

Resistor members $R_{36}$, $R_{50}$ and $R_{66}$ are preferably of a substantially greater magnitude than any of the other resistors. This condition will assist in providing a balanced high input impedance condition; the input impedance preferably being in the order of 20,000 ohms or higher.

Output terminal 16 of the resistive network corresponds to intermediate leg terminal 35. Output terminal 18 corresponds to the junction 62 intermediate resistor members 56, 58 of leg 26. The equivalent resolver signals which will be established intermediate output terminals 16–20 and 18–20 may be represented by the mathematical relationships (3) and (4) above. These signals may then be presented to a phase shift network 100 of, for example, the type which is the subject of the aforementioned Patent Number 2,968,759. Phase shift network 100 includes individual phase shift circuits 110, 111, respectively. Phase shift circuit 110 comprises a capacitor 112 which is connected to output terminal 18 of the synchro resolver converter, and a variable resistor 114 connected in series therewith. Similarly, phase shift 111 comprises a variable resistor 115 connected to synchro resolver output terminal 16 and a capacitor 116. Resistor 114 and capacitor 116 are connected to common lead 107 which is connected through resistor 119 to the cathode elements of dual cathode follower 118, the grids of which are connected to the phase shift circuit 110 and 111 between the capacitor and resistor of each device by means of leads 121, 122, respectively. A constant DC voltage is impressed on the plates of the dual cathode follower by means of a common connection 124 and a voltage source B+ (not shown). A lead 125 connects the cathode elements to the output, which, as discussed in that patent, will provide a constant amplitude signal related in phase to the equivalent resolver rotor angle θ. That is, the combination of synchro resolver converter network 8 and phase shift network 100 serves to transform the synchro input signals as represented in Equations 1–3 above, into a single output signal, representative of the angular position θ. This output signal at 125 may, in turn, be presented to an appropriate device which is sensitive to phase variations, such as a phase detector or phase measuring servo system. Alternatively, the signal may be presented to a phase-to-analog or digital converter, as shown by 130, with such converter also receiving a reference phase signal 132, so as to provide an output signal 135 which will be an analog or digital representation of the synchro rotor angular position.

The space vector relationships between the synchro input signals (1), (2), (3) and the equivalent resolver signals (4), (5) is as shown in FIGURE 2, where the projection of the lengths of the vectors on the horizontal axis is proportional to the magnitude of the respective voltages. FIGURE 2 depicts these magnitudes for a synchro rotor positioned at its electrical zero.

Considering now the necessary relationships which must be satisfied to insure the desired signal conversion, reference is now made to FIGURE 3, which shows the generalized impedance network derived by a space vector consideration of FIGURE 2. Those portions of the generalized network corresponding to the synchro-resolver converter of FIGURE 1 are indicated by like numerals. It has been mathematically determined that the impedance network of FIGURE 3 will provide the requisite relationship between the synchro signals represented by Equations 1, 2 and 3 above, and the equivalent resolver signals represented by Equations 4 and 5 above, providing that the impedances satisfy the following relationships:

(6) $\quad Z_1 = Z_2$ (7) $\quad Z_8 = Z_9 = (Z_1 + Z_2)$ (8) $\quad Z_6 = Z_7 = (Z_4 + Z_5)$ (9) $\quad Z_{10} = Z_{11} = Z_{12}$

(10) $\quad Z_4 = \left(1 + \frac{1}{2} - \frac{\sqrt{3}}{2}\right) Z_6$

(11) $\quad Z_5 = \left(\frac{\sqrt{3}}{2} - \frac{1}{2}\right) Z_6$

The above relationships provide the constraints that insure that the network will present a balanced input impedance to the synchro driven circuit, and will furthermore generate the equivalent resolver signals at the output terminals.

The generalized impedance network shown in FIGURE 3 may be constructed of a resistive network, as shown in FIGURE 1. To simplify the ensuing discussion of that network, reference is now made to FIGURE 4, wherein the resistive synchro-resolver converter network 8 of FIGURE 1 is shown with those resistors of equal value being so designated. To facilitate comparison of FIGURE 4 with FIGURE 1, the corresponding numerical designations of the components are shown in parenthesis. The input impedances between the terminals 10, 12, 14 may be mathematically expressed as follows:

(12) $\quad Z_{10-12} = 2R_5 + 2\left(\frac{R_1 R_2}{R_1 + 2R_2}\right)$

(13) $\quad Z_{12-14} = 2R_5 + 2\left(\frac{R_1 R_2}{R_1 + 2R_2}\right)$

(14) $\quad Z_{14-10} = 2R_5 + 2\left(\frac{R_1 R_2}{R_1 + 2R_2}\right)$

If $R_1$ is expressed as follows:

(15) $\quad R_1 = bR_2$ where $b$ is a constant, the input impedances may be represented as follows:

(16) $\quad Z_{10-12} = 2\left(R_5 + \frac{b}{2+b} R_2\right)$

(17) $\quad Z_{12-14} = 2\left(R_5 + \frac{b}{2+b} R_2\right)$

(18) $\quad Z_{14-10} = 2\left(R_5 + \frac{b}{2+b} R_2\right)$

By expressing $$R_5 = aR_2$$

where $a$ is a constant, the input impedance may now be represented by the mathematical relationship

(19) $\quad Z_{in} = 2\left(a + \frac{b}{2+b}\right) R_2$

Making the assumption that $R_5$ will be substantially greater than $R_2$, or that the constant, $a$, will be substantially greater than unity, the input impedance may be now be represented by the approximation

(20) $\quad Z_{in} \cong 2(a+1) R_2$

It has been further determined that the resistances $R_3$ and $R_4$ must be related to $R_2$ by the relationships:

(21) $\quad R_3 = CR_2$

(22) $\quad R_4 = (1-C) R_2$

(23) $\quad \text{with } C = \left(1 + \frac{1}{2} - \frac{\sqrt{3}}{2}\right) = 0.634$ The output impedances of the resistive network may be represented by the following mathematical relationships:

(24) $\quad Z_{18-20} = \frac{1}{2}\left(b + \frac{\sqrt{3}a + (\sqrt{3}-1)}{a+1}\right) R_2$

(25) $\quad Z_{16-20} = \frac{b}{2}\left(\frac{1+a+2a/b}{1+a+a/b}\right) R_2$

Again making the assumption that $a \gg 1$, the output impedances may be represented by the approximation

(26) $\quad Z_{18-20} \cong \frac{1}{2}(b + \sqrt{3}) R_2$

(27) $\quad Z_{16-20} \cong \frac{b}{2}\left(\frac{2+b}{2+b}\right) R_2$

A plot of the manner in which the input and output impedances vary with the selection of the constants $a$ and $b$ is shown in FIGURE 5. Curve 140 shows the relationship of the input impedance as a function of the constant $a$. Curve 142 shows the relationship of the output impedance between terminals 16 and 20, divided by $R_2$, as a function of the constant $b$. Curve 144 shows the relationship of the output impedance between terminals 18 and 20, similarly divided by the resistive value $R_2$, as a function of the constant $b$. For convenience of plotting, the ordinate of curve 140 is substantially more compressed than that of curves 142, 144. Hence, it is seen that as the value $a$ increases in magnitude, it will effect a substantially greater increase in the input impedance than will be effected by a corresponding increase in magnitude in the constant $b$.

In the design of a resistive conversion network to satisfy the particular system requirements, the designer should consider the mathematical expressions (21), (23), (26), and (27) for the input and output impedances, as well as the graphical variation of these parameters as shown in FIGURE 5. Although it should be recognized that numerous systems may be designed in accordance with the teachings of our invention, the following is a typical signal transformation network which may be used:

$b = 1.0$
$R_2 = 75$ ohms
$R_1 = bR_2 = 75$ ohms
$R_3 = .634 R_2 = 47.5$ ohms
$R_4 = .366 R_2 = 27.5$ ohms
$R_5 = aR_2 = 10,200$ ohms In deriving these values, a selection is first made of the constant $b$, and the desired input impedance. This will then permit a derivation of the requisite constant, $a$, as well as the other circuit components. In the particular example shown above, the input impedance will be substantially balanced at 20,000 ohms between each of the branches, with the output impedance being of a considerably lesser magnitude, as, for example, in the order of 50 to 250 ohms.

It is naturally understood that these parameters are given merely for illustrative purposes and are no ways intended to limit the scope of our invention.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive property or privilege is claimed are defined as follows:

1. In a signal transformation network comprising first, second and third input terminal means for receiving synchro output signals $E_1$, $E_2$ and $E_3$, respectively, represented by the relationships $$E_1 = E \sin \theta$$
$$E_2 = E \sin (\theta + 120°)$$
$$E_3 = E \sin (\theta + 240°)$$

where:

$\theta$ denotes angular position of a synchro rotor and
E is the maximum RMS value of each of said signals;

output terminal means for deliverying equivalent resolver signals $E_{nx}$ and $E_{ny}$, respectively, represented by the relationships $$E_{nx} = kE \sin \theta$$
$$E_{ny} = kE \sin (\theta + 90°)$$

where $k$ is a constant;

passive circuit elements connected between said input and output terminal means and having the property of transforming said synchro output signals received at said input terminal means to said equivalent resolver signals delivered at said output terminal means, said passive circuit elements establishing a first, second and third input impedances between the respective ones of said input terminal means, said input impedances being substantially equal to each other such that said input terminal means is characterized by a balanced input condition for the reception of said synchro output signals.

2. In a signal transformation network as set forth in claim 1, wherein said balanced input impedances are of a substantial magnitude, at least in the order of 20,000 ohms.

3. In a signal transformation network comprising first, second and third input terminal means for receiving synchro output signals $E_1$, $E_2$ and $E_3$, respectively, represented by the relationships $$E_1 = E \sin \theta$$
$$E_2 = E \sin (\theta + 120°)$$
$$E_3 = E \sin (\theta + 240°)$$

where:

$\theta$ denotes angular position of a synchro rotor and
E is the maximum RMS value of each of said signals;

output terminal means for delivering equivalent resolver signals $E_{nx}$ and $E_{ny}$, respectively, represented by the relationships $$E_{nx} = kE \sin \theta$$
$$E_{ny} = kE \sin (\theta + 90°)$$

where $k$ is a constant;

passive circuit elements connected between said input and output terminal means and having the property of transforming said synchro output signals received at said input terminal means to said equivalent resolver signals delivered at said output terminal means, said passive circuit elements establishing a first, second and third input impedances between the respective ones of said input terminal means, said input impedances being substantially equal to each other such that said input terminal means is characterized by a balanced input condition for the reception of said synchro output signals; said passive circuit elements establishing first and second output impedances at the output terminal means delivering the respective ones of said equivalent resolver signals; said input impedances having a substantially greater magnitude than said output impedances.

4. In a signal transformation network comprising first, second and third input terminal means for receiving synchro output signals $E_1$, $E_2$ and $E_3$, respectively, represented by the relationships $$E_1 = E \sin \theta$$
$$E_2 = E \sin (\theta + 120°)$$
$$E_3 = E \sin (\theta + 240°)$$

where:

$\theta$ denotes angular position of a synchro rotor and
E is the maximum RMS value of each of said signals;

output terminal means for delivering equivalent resolver signals $E_{nx}$ and $E_{ny}$, respectively, represented by the relationships $$E_{nx} = kE \sin \theta$$
$$E_{ny} = kE \sin (\theta + 90°)$$

where $k$ is a constant;

passive circuit elements connected between said input and output terminal means and having the property of transforming said synchro output signals received at said input terminal means to said equivalent resolver signals delivered at said output terminal means; said passive circuit elements including a first, second and third resistor, each having first and second terminals, respectively, the first terminals of each of said resistors electrically connected together to form a common juncture point; the second terminals of said first, second and third resistors series connected to said first, second and third input terminal means, respectively, to define first, second and third series legs extending from said juncture point to their respective input terminal means; said output terminal means including a first output terminal, a second output terminal and a common output termnial; a first bridging circuit extending between two of said series legs, intermediate the said second terminals of their respective juncture forming resistors, and their respective input terminals; said common output terminal series connected to said first bridging circuit; said first and second output terminals series connected to selected ones of said series legs, intermediate the said second terminals of their respective juncture forming resistors, and their respective input terminals.

5. In a signal transformation network as set forth in claim 4, wherein one of said series legs is common to both said first bridging circuit, and one of said first or second output terminal series connections.

6. In a series transformation network as set forth in claim 4, wherein one of said equivalent resolver signals is established between said first output terminal and said common output terminal, and the other of said equivalent resolver signals is established between said second output terminal and said common output terminal; said passive circuit elements establishing a first, second and third input impedances between the respective ones of said input terminal means, said input impedances being substantially equal to each other such that said input terminal means is characterized by a balanced input condition for the reception of said synchro output signals; said passive circuit elements establishing first and second output impedances intermediate asid first and common output terminals, and said second and common output terminals; said input impedances having a substantially greater magnitude than said output impedances.

7. In a signal transformation network comprising first, second and third input terminal means for receiving synchro output signals $E_1$, $E_2$ and $E_3$, respectively, represented by the relationships $$E_1 = E \sin \theta$$
$$E_2 = E \sin (\theta + 120°)$$
$$E_3 = E \sin (\theta + 240°)$$

where:

$\theta$ denotes angular position of a synchro rotor and $E$ is the maximum RMS value of each of said signals;

output terminal means for delivering equivalent resolver signals $E_{nx}$ and $E_{ny}$, respectively, represented by the relationships $$E_{nx} = kE \sin \theta$$
$$E_{ny} = kE \sin (\theta + 90°)$$

where $k$ is a constant;

passive circuit elements connected between said input and output terminal means and having the property of transforming said synchro output signals received at said input terminal means to said equivalent reservoir signals delivered at said output terminal means; said passive circuit elements including a first, second and third resistor, each having first and second terminals, respectively, the first terminals of each of said resistors electrically connected together to form a common juncture point; the second terminals of said first, second and third resistors series connected to said first, second and third input terminal means, respectively, to define first, second and third series legs extending from said juncture point to their respective input terminal means; each of said legs including an additional resistor intermediate the second terminal of its respective one of said juncture forming resistors, and its input terminal; each of said additional resistors having a first terminal being conducted toward said juncture and a second terminal being connected towards its respective input terminal; the resistance in each of said legs between the first terminal of its said additional resistor and said juncture being substantially equal, at a first value; and between said first terminal of its said additional resistor and its respective input terminal being substantially equal at a second value; said resistors establishing a first, second and third input impedances between the respective ones of said input terminal means, said input impedances being substantially equal to each other such that said input terminal means is characteried by a balanced input condition for the reception of said synchro output signals.

8. In a series transformation network as set forth in claim 7, wherein said additional resistor second terminals correspond to said input terminals, whereby said second value is equal to the value of said additional resistor, said second value having a magnitude substantially greater than said first value.

9. In a series transformation network as set forth in claim 8, wherein the relationship between said first value and said second value is represented by $$R_2 = aR_1$$

where $R_2$ is the magnitude of said second value; $R_1$ is the magnitude of said first value; and $a$ is a constant substantially greater than unity; and said first, second, and third input impedances are approximated by the relationship $$2(a+11)R_2$$

10. In a signal transformation network comprising first, second and third input terminal means for receiving synchro output signals $E_1$, $E_2$ and $E_3$, respectively, represented by the relationships $$E_1 = E \sin \theta$$
$$E_2 = E \sin (\theta + 120°)$$
$$E_3 = E \sin (\theta + 240°)$$

where:

$\theta$ denotes angular position of a synchro rotor and $E$ is the maximum RMS value of each of said signals;

output terminal means for delivering equivalent resolver signals $E_{nx}$ and $E_{ny}$, respectively, represented by the relationships $$E_{nx} = kE \sin \theta$$
$$E_{ny} = kE \sin (\theta + 90°)$$

where $k$ is a constant;

passive circuit elements connected between said input and output terminal means and having the property of transforming said synchro output signals received at said input terminal means to said equivalent resolver signals delivered at said output terminal means; said passive circuit elements consisting of a plurality of resistors, of predetermined value, and circuit connected between said input and output terminal means in a predetermined array; said resistors including a first, second and third resistor, each having first and second terminals, respectively, the first terminals of each of said resistors electrically connected together to form a common juncture point; the second terminals of said first, second and third resistors series connected to said first, second and third input terminal means, respectively, to define first, second and third series legs extending from said juncture point to their respective input terminal means; a fourth resistor series connected intermediate said first input terminal means and the said second terminal of said first resistor; a fifth resistor series connected between said second input terminal means and the said second terminal of said second resistor; a sixth resistor series connected intermediate said third input terminal means and the said second terminal of said third resistor; each of said fourth, fifth and sixth resistors having a first and second terminal; said first terminals circuit connected to an intermediate leg point, separated from said juncture point by substantially equal resistance magnitudes of a first value; said second terminals directly connected to the respective ones of said input terminal means; said fourth, fifth and sixth resistors substantially equal magnitudes, at a second value, whereby said intermediate leg points are series separated from their respective input terminals by said second value; said second value substantially greater than said first value.

11. In a series transformation network as set forth in claim 10, wherein the relationship between said first value and said second value is represented by $$R_2 = aR_1$$

where $R_2$ is the magnitude of said second value; $R_1$ is the magnitude of said first value; and $a$ is a constant substantially greater than unity; said resistors establishing a first, second and third input impedances between the respective ones of said input terminal means, said input impedances being substantially equal to each other such that said input terminal means is characterized by a balanced input condition for the reception of said synchro output signals, and said first, second, and third input impedances are approximated by the relationship $$2(a+1)R_2$$

12. In a series transformation network as set forth in claim 11, wherein said balanced input impedances are of a substantial magnitude, at least in the order of 20,000 ohms.

13. In a signal transformation network comprising first, second and third input terminal means for receiving synchro output signals $E_1$, $E_2$ and $E_3$, respectively, represented by the relationships $$E_1 = E \sin \theta$$
$$E_2 = E \sin (\theta + 120°)$$
$$E_3 = E \sin (\theta + 240°)$$

where:

$\theta$ denotes angular position of a synchro rotor and $E$ is the maximum RMS value of each of said signals;

output terminal means for delivering equivalent resolver signals $E_{nx}$ and $E_{ny}$, respectively, represented by the relationships $$E_{nx} = kE \sin \theta$$
$$E_{ny} = kE \sin (\theta + 90°)$$

where $k$ is a constant;

passive circuit elements connected between said input and output terminal means and having the property of transforming said synchro output signals received at said input terminal means to said equivalent resolver signals delivered at said output terminal means; said passive circuit elements consisting of a plurality of resistors, of predetermined value, and circuit connected between said input and output terminal means in a predetermined array; said resistors including a first, second and third resistor, each having first and second terminals, respectively, the first terminals of each of said resistors electrically connected together to form a common jucture point; the second terminals of said first, second and third resistors series connected to said first, second and third input terminal means, respectively, to define first, second and third series legs extending from said juncture point to their respective input terminal means; a fourth resistor series connected intermediate said first input terminal means and the said second terminal of said first resistor; a fifth resistor series connected between said second input terminal means and the said second terminal of said second resistor; a sixth resistor series connected intermediate said third input terminal means and the said second terminal of said third resistor; each of said fourth, fifth and sixth resistors having a first and second terminal; said first terminals circuit connected to an intermediate leg point, separated from said juncture point by substantially equal resistance magnitudes of a first value; said second terminals directly connected to the respective ones of said input terminal means; said fourth, fifth and sixth resistors of substantally equal magnitudes, at a second value, whereby said intermediate leg points are series separated from their respective input terminals by said second value; a first bridging circuit series connected between the intermediate leg points of said first and second legs; a second bridging circuit series connected between the intermediate leg points of said second and third legs, and a third bridging circuit series connected between the intermediate leg points of said third and first legs; each of said bridging circuits of a substantially equal resistance magnitude, equal to a third value; said resistors establishing a first, second and third input impedances between the respective ones of said input terminal means, said input impedances being substantially equal to each other such that said input terminal means is characterized by a balanced input condition for the reception of said synchro output signals; said output terminal means including a first output terminal, a second output terminal and a common output terminal; said first, second and third values of predetermined magnitude such that said balanced input impedances are characterized as being of a substantially greater magnitude than said output impedances; said resistors establishing first and second output impedances intermediate said first and common output terminals, and said second and common output terminals.

14. In a series transformer network as set forth in claim 13 wherein said first output terminal is connected to a point of said third leg intermediate said juncture point and said first terminal of said sixth resistor; said second output terminal is connected to the intermediate leg point of said first leg, said common point being connected to the bridging circuit connected between said first and second legs.

15. In a series transformation network as set forth in claim 14, further including a phase shift circuit including first and second and a common input terminals; circuit means for presenting said equivalent resolver voltage appearing at said first output, second output and common output terminals to said first and second input and common terminals of said phase shift circuit; a common output terminal of said phase shift circuit; said phase shift circuit having the property of transforming said equivalent resolver voltages into a constant amplitude signal related in phase to $\theta$, whereby said signal transformation network provides circuit means for converting synchro output signals to a constant amplitude signal representative of the synchro rotor angle position.

16. In a signal transformation network comprising first, second and third input terminal means for receiving synchro output signals $E_1$, $E_2$ and $E_3$, respectively, represented by the relationships $$E_1 = E \sin \theta$$
$$E_2 = E \sin (\theta + 120°)$$
$$E_3 = E \sin (\theta + 240°)$$

where:

$\theta$ denotes angular position of a synchro rotor and
E is the maximum RMS value of each of said signals;

output terminal means for delivering equivalent resolver signals $E_{nx}$ and $E_{ny}$, respectively, represented by the relationships $$E_{nx} = kE \sin \theta$$
$$E_{ny} = kE \sin (\theta + 90°)$$

where $k$ is a constant;

passive circuit elements connected between said input and output terminal means and having the property of transforming said synchro output signals received at said input terminal means to said equivalent resolver signals delivered at said output terminal means, said passive circuit elements consisting of a plurality of resistors, of predetermined value, and circuit connected between said input and output terminal means in a predetermined array.

17. A signal transformation network as set forth in claim 16 further including a phase shift circuit including first and second input terminals; circuit means for presenting said equivalent resolver voltages to said first and second input terminals; a common output terminal; said phase shift circuit having the property of transforming said equivalent resolver voltages into a constant amplitude signal related in phase to $\theta$, whereby said signal transformation network provides circuit means for converting synchro output signals to a constant amplitude signal representative of the synchro rotor angle position.

References Cited

UNITED STATES PATENTS

| | | | |
|---|---|---|---|
| 2,968,759 | 1/1961 | McKenney et al. | 323—122 X |
| 3,265,904 | 8/1966 | Spencer | 307—88.5 |

JOHN F. COUCH, *Primary Examiner.*

WARREN E. RAY, *Examiner.*

G. GOLDBERG, *Assistant Examiner.*